United States Patent [19]

Sangster et al.

[11] Patent Number: 4,479,637
[45] Date of Patent: Oct. 30, 1984

[54] APPARATUS FOR AND METHOD OF REPAIRING BOTTOM LINING OF A CONVERTER

[75] Inventors: William H. Sangster, Collinsville; Gilbert G. Moss, Fairview Hgts., both of Ill.

[73] Assignee: National Steel Corporation, Pittsburgh, Pa.

[21] Appl. No.: 413,754

[22] Filed: Sep. 1, 1982

[51] Int. Cl.³ .............................................. C21C 5/46
[52] U.S. Cl. ..................................... 266/281; 266/903
[58] Field of Search ................ 266/281, 243, 903, 287

[56] References Cited

U.S. PATENT DOCUMENTS

| 3,230,685 | 1/1966 | Tiefenthal | 52/749 |
|---|---|---|---|
| 3,256,956 | 6/1966 | Pühringer | 182/128 |
| 3,259,208 | 7/1966 | Behr | 182/128 |
| 3,298,154 | 1/1967 | Behr et al. | 52/749 |
| 3,435,321 | 12/1969 | Smith, Jr. | 182/141 |
| 3,517,771 | 6/1970 | Mähringer et al. | 182/141 |
| 3,866,382 | 2/1975 | Van Tassel | 52/741 |
| 3,955,685 | 5/1976 | Smith | 214/1 |
| 4,039,174 | 8/1977 | Poff et al. | 266/281 |
| 4,058,184 | 11/1977 | Stuart et al. | 182/128 |
| 4,061,319 | 12/1977 | Tanaka et al. | 266/281 |
| 4,077,616 | 3/1978 | Smejkal et al. | 266/281 |
| 4,127,626 | 11/1978 | Kubo et al. | 264/30 |
| 4,354,670 | 10/1982 | Eichbaum et al. | 266/281 |

FOREIGN PATENT DOCUMENTS 0197641 11/1963 U.S.S.R. ............... 266/281

Primary Examiner—L. Dewayne Rutledge
Assistant Examiner—S. Kastler
Attorney, Agent, or Firm—O'Neil & Bean

[57] ABSTRACT

Apparatus for use in repairing the lining of a metallurgical furnace or converter includes a work platform supported for elevation from below the converter vessel into the opening formed by removal of the bottom plug. A safety shield is supported above the platform for limited vertical movement relative to the platform. The shield can be radially expanded within the converter to a diameter substantially greater than that of the bottom hole to provide an effective umbrella-like shield protecting workers on the platform from radiated heat from the interior of the converter and from falling debris while at the same time allowing ventilation air to pass up through the converter. The apparatus is especially useful in repairing the refractory lining in the bottom of a Q-BOF, particularly the refractory rings surrounding the bottom plug, during which repair the safety shield can be lowered to contact the bottom of the refractory lining outboard of the area being repaired.

9 Claims, 8 Drawing Figures

APPARATUS FOR AND METHOD OF REPAIRING BOTTOM LINING OF A CONVERTER

BACKGROUND OF THE INVENTION

1. Field of the Invention

This invention relates to apparatus for and methods of repairing or relining metallurgical vessels, and more particularly to an improved work support platform including a safety shield adapted to be projected upwardly through the opening in the bottom of a metallurgical furnace such as a Q-BOF when the bottom plug is removed.

2. Description of the Prior Art

It is well known to employ a vertically adjustable work platform to support workers and materials at the desired elevation to reline or repair the refractory lining of a metallurgical furnace or converter. Converter vessels conventionally are constructed with a relatively large opening in the bottom wall which is closed during operation by a removable refractory lined plug. During relining or lining repair, this bottom plug is removed and the work platform apparatus is positioned directly beneath the opening in the bottom wall so that the platform can be projected upwardly into the converter.

The open top and the opening in the bottom wall are substantially smaller than the main body of a converter vessel. Accordingly, the work platform has conventionally employed some means for expanding the structure outwardly from the vertical elevator support. Personnel working on the platform thus may be working at a location beneath the inwardly tapered top or "hat" section of the converter so that, during repair, debris falling from the lining above can present a serious work hazzard. The prior art vertically adjustable work platforms have not included any means for shielding workers from such falling debris.

It is frequently necessary to repair only the bottom wall portion of the lining of a converter vessel, particularly the refractory rings adjacent the bottom plug of a Q-BOF. In making such repairs to the bottom wall, it is desirable to avoid cooling the converter more than necessary. In the past, however, heat radiation has prevented work even in the area adjacent the bottom opening until the converter has reached a relatively low temperature which could be tolerated by the unshielded workers.

U.S. Pat. No. 3,230,685 recognizes the danger to workers in a converter as a result of falling debris such as slag or fragments of the refractory lining, especially from the inwardly inclined wall portion adjacent the open top, and proposes to protect such workers by an inflatable cone-shaped ring which theoretically can be held in firm contact with the overhanging portion of the converter wall by a cable suspension system extending through the open top. The effectiveness of this inflatable, flexible hollow annular body for its stated purpose would appear to be at least questionable, however, in the absence of substantial rigid reinforcement to retain the flexible member in the desired configuration. Further, since the main wall of the converter is not contacted by the flexible member, this safety device would be largely ineffective in shielding workers repairing the bottom wall from radiated heat and falling debris from the main body of the converter.

It is the primary object of the present invention to provide an improved method of and apparatus for use in repairing the lining of a metallurgical furnace which avoids the foregoing and other defects of the prior art.

It is another object of the invention to provide a method of and apparatus for use in repairing the lining of a converter vessel in which workers are shielded from falling debris and heat radiated from the interior of the vessel above the level of the workers.

Another object of the invention is to provide an improved method of and apparatus for repairing the bottom wall of a converter vessel in which a radially expandable structural shield is initially telescoped into the interior of the vessel through the hole in the bottom wall and then radially expanded to provide an umbrella-like shield for workers supported on a work platform below the shield.

Another object of the invention is to provide such an apparatus for use in repairing the bottom wall of the converter vessel of a Q-BOF in which an umbrella-like protective shield may be lowered into contact with the bottom wall of the converter vessel outboard of the area being repaired and which permits ventilation through the bottom hole whereby repairs may be made to the bottom wall while the converter is maintained at a higher temperature than was previously practical.

SUMMARY OF THE INVENTION

In the attainment of the foregoing and other objects and advantages, an important feature of the invention resides in providing converter lining repair apparatus including a work platform having a safety shield supported thereon and which may be vertically elevated from a position below the converter to project the shield into the hole in the bottom wall upon removal of the bottom plug. The shield is spaced above the platform to enable workers on the platform to perform their job, and means are provided to raise and lower the shield relative to the platform. The shield has a rigid central portion dimensioned to pass into the converter, and extension plate members are supported in position to be projected radially outward from the central portion.

Preferably the plate members of the shield are mounted in overlapping relation to provide a substantially continuous umbrella-like cover shielding workers therebelow from falling debris and radiated heat; however, the plate members are preferably perforated to permit ventilating air to be drawn upward through the converter by a chimney effect to provide a safer, more comfortable working environment for personnel on the work platform beneath the umbrella.

After the shield has been radially expanded, it may be lowered so that the outer edge portions of the plate members extend in close proximity to the converter wall, or rest on the bottom wall outboard of the area being repaired. Further, in the extended position, the plate members may be positioned in an inclined attitude so that the central portion of the protective shield is elevated to provide additional working space. When the repair is completed, the shield can be raised and the plate members retracted, then the entire apparatus can be lowered from within the converter.

The invention is particularly useful in repairing the bottom walls of a converter, and more particularly the refractory lining rings adjacent the removable bottom plug of a converter and will be described hereinbelow with reference to such an apparatus. It should be apparent however that the invention may also be employed in connection with converter relining apparatus generally.

BRIEF DESCRIPTION OF THE DRAWINGS

The foregoing and other objects and advantages of the invention will be apparent from the detailed description contained hereinbelow, taken in conjunction with the drawings, in which.

DESCRIPTION OF THE PREFERRED EMBODIMENT

Figure 1:
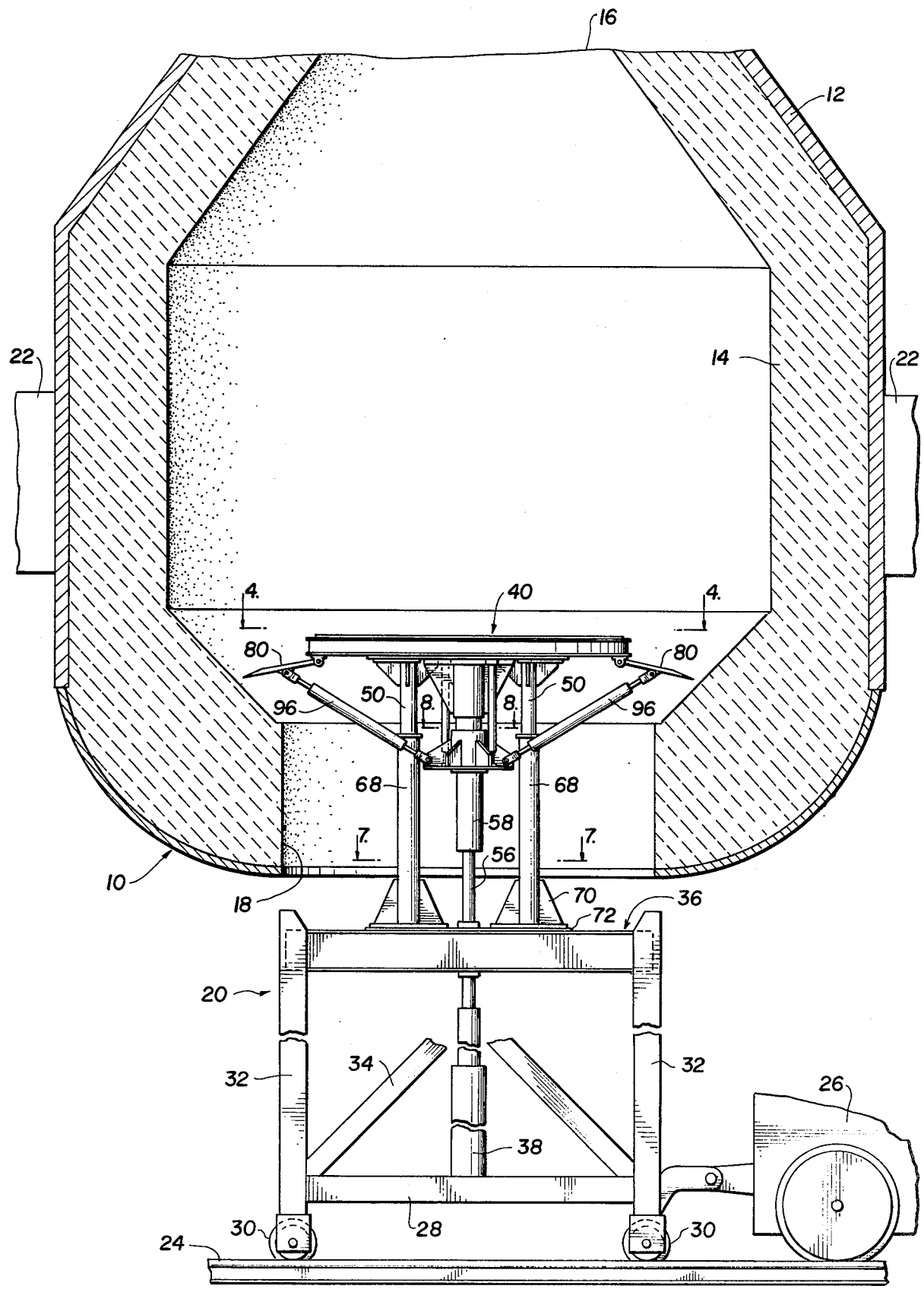
FIG. 1 is an elevation view, partially in section, diagrammatically showing a converter lining apparatus embodying a safety shield according to the present invention projecting into the bottom of a Q-BOF.

Referring now to the drawings in detail, the metallurgical vessel portion of a Q-BOF of conventional construction is schematically illustrated in FIG. 1 and designated generally by the reference numeral 10. The vessel includes an outer metal shell or housing 12 having a refractory lining 14 completely covering its inner surface. The top portion of shell 12 and liner 14 taper inwardly in a generally conical configuration, terminating in an open top 16 having a diameter substantial less than the maximum diameter of the vessel. The bottom wall of the vessel has a large circular opening 18 normally closed by a refractory lined plug adapted to be removed to permit access to the interior of the vessel through the bottom wall. In FIG. 1, the bottom plug is removed and the vessel repair apparatus, indicated generally at 20, is shown projecting into the vessel through the opening 18. Vessel 10 is supported by a pair of trunnions 22, partially broken away in FIG. 1, for rotation about a horizontal axis on suitable support structure (not shown), with the bottom of the vessel spaced a substantial distance above the floor. A set of tracks 24 are supported on the floor beneath the vessel for carrying a conventional ladle car, a portion of which is shown at 26 in FIG. 1. The ladle car 26 can be used to move the repair apparatus 20 along tracks 24 into position beneath the vessel 10 for use in liner repair in the manner described hereinbelow.

The lining apparatus 20 includes a movable elevator structure for supporting a worker's platform for vertical movement to project the platform into the bottom opening of the metallurgical vessel. The elevator structure may be of known construction and is schematically illustrated in FIG. 1 as including a rigid base 28 supported by wheels 30 for movement along tracks 24. A plurality of vertically extending guide posts 32 project upwardly from base 24 and are retained in fixed spaced relation by suitable cross bracing members 34. A work platform 36 is supported for vertical movement by suitable lifting means such as a plurality of jack screws or the hydraulic lifting cylinder schematically illustrated at 38 for movement along the guide posts 32 to support workers and materials at the desired level for the specific repair operation to be performed.

In the embodiment illustrated in FIG. 1, the repair apparatus is intended primarily for use in repairing the bottom wall refractory lining around the bottom opening 18 and the movable work platform structure is therefore positioned below the bottom of the converter vessel.

In accordance with the present invention, a combined heat and safety shield assembly, indicated generally by the reference numeral 40, is mounted on and projects above the platform 36 into the interior of the vessel 10. Shield 40 includes a substantially circular, horizontally disposed table-like central portion including a top cover plate 42 supported adjacent its outer periphery by a circular support beam 44 which, in turn, is rigidly welded to and supported by a grid of structural beams 46. A central bearing plate 48 is welded to the bottom surface of beams 46 and three substantially identical legs 50 are rigidly joined to and project downwardly from bearing plate 48. A bushing 52 and gussets 54 reinforce the joint between the respective legs 50 and the bearing plate 48. Legs 50 are radially equally spaced from the center of cover plate 42 and equally spaced from one another to provide a sturdy three-point support for the shield.

A hydraulic ram 56 has its base supported on the platform 36 and projects upwardly into a tubular guide member 58 having its upper end rigidly welded to bearing plate 48 and reinforced by gussets 60. Hydraulic cylinder 56 has its piston 62 connected through a clevis 64 and pin 66 to the upper reinforced portion of guide 58 whereby actuation of the cylinder to extend piston 62 will raise the shield assembly.

Figure 7:
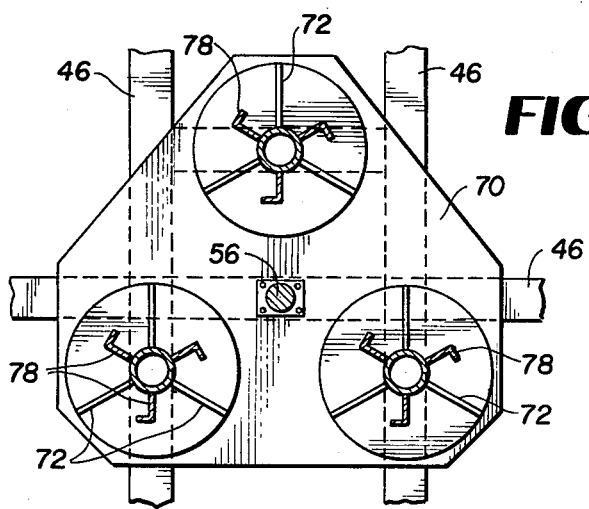
FIG. 7 is an enlarged sectional view taken on line 7—7 of FIG. 1.
Figure 8:
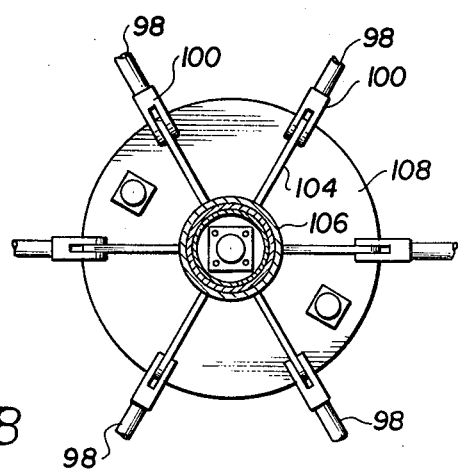
FIG. 8 is an enlarged sectional view taken on line 8—8 of FIG. 1.

Legs 50 each extend into the open top of an upwardly extending cylindrical column 68. Columns 68 are each rigidly welded to a bearing plate 70 supported on the top surface of platform 36, with gusset 72 reinforcing the connection between columns 68 and plate 70. A plurality of pairs of diametrically opposed openings 74 are formed in the respective columns 68 at spaced intervals along their length for receiving a transversely extending pin 76 in position to engage and support the bottom end of the legs 50. As shown in FIG. 7, structural angles 78 are welded to and extend along columns 68 to provide additional column and bending strength; however, for clarity of illustration, these structural angles have been omitted from other views of the drawings.

Figure 4:
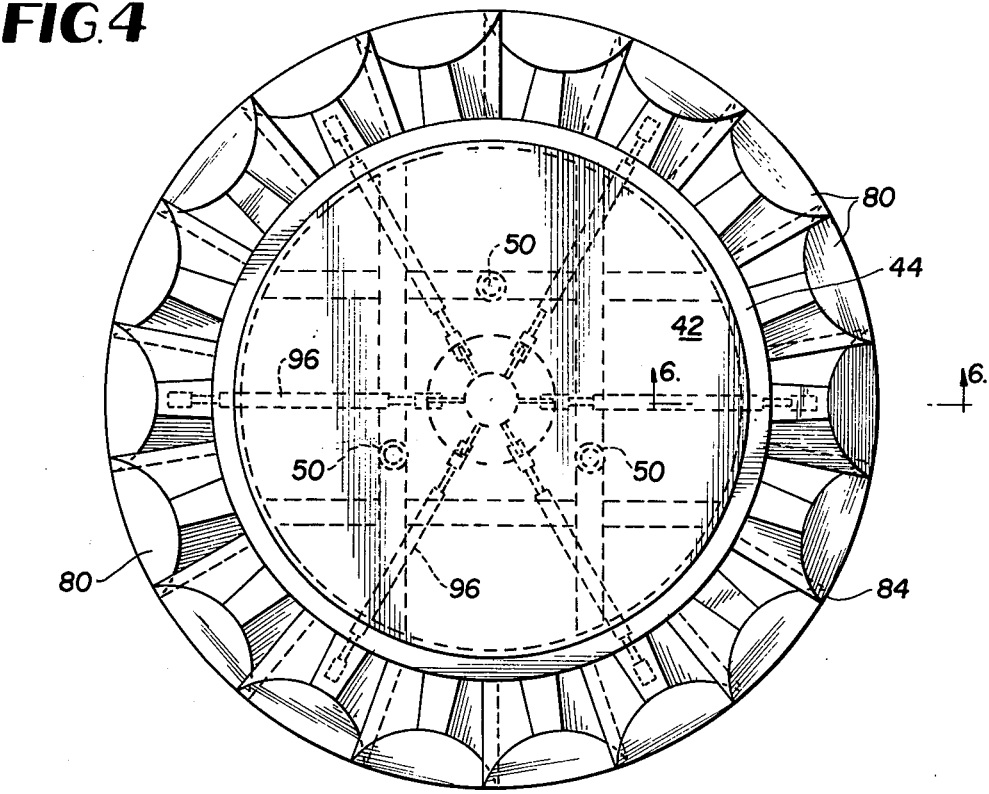
FIG. 4 is a plan view taken on line 4—4 of FIG. 1.
Figure 6:
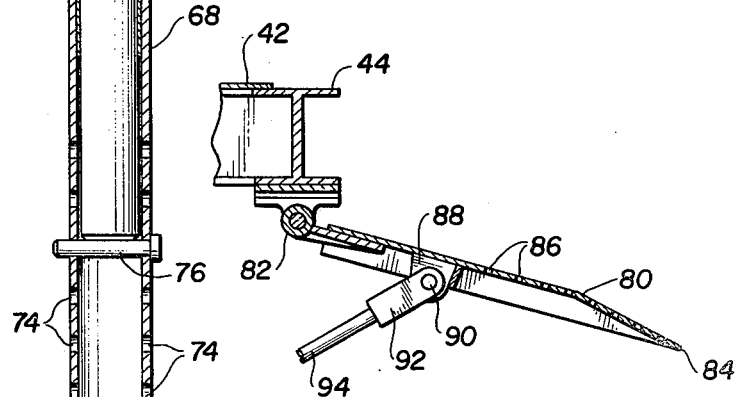
FIG. 6 is an enlarged fragmentary sectional view taken on line 6—6 of FIG. 4.

As is apparent from FIG. 1, the diameter of the circular structural member 44 is slightly less, for example about 1 foot less, than the diameter of the hole 18 in the bottom wall of the vessel 10. Once the shield is inside the vessel, however, it is radially extended to provide maximum protection against falling debris and against radiated heat from within the vessel. This is accomplished by providing a plurality of wing-like plate members 80, each pivotally connected by a hinge assembly 82 rigidly joined, as by welding, to the bottom flange of structural beam 44. As illustrated in FIGS. 4 and 6, plates 80 are preferably contoured to present an upwardly convex surface to increase their strength and resistance to bending upon impact of falling slag or the like.

Plates 80 are mounted in equally spaced overlapping relation around the periphery of beam 42 so that all plate members are constrained to move together about their respective hinges 82 in the manner described more fully hereinbelow. The outer peripheral edge portion of the respective plates are contoured so that, in the raised or extended position shown in FIGS. 3 and 6, they cooperate to define a substantially continous circular peripheral edge 84 on the umbrella-like shield assembly. Plates 80 preferably have a plurality of ventilating openings, or perforations 86 formed therein to facilitate the flow of ventilating air upward through the bottom opening in the metallurgical vessel 10 when the apparatus is in use.

Figure 2:
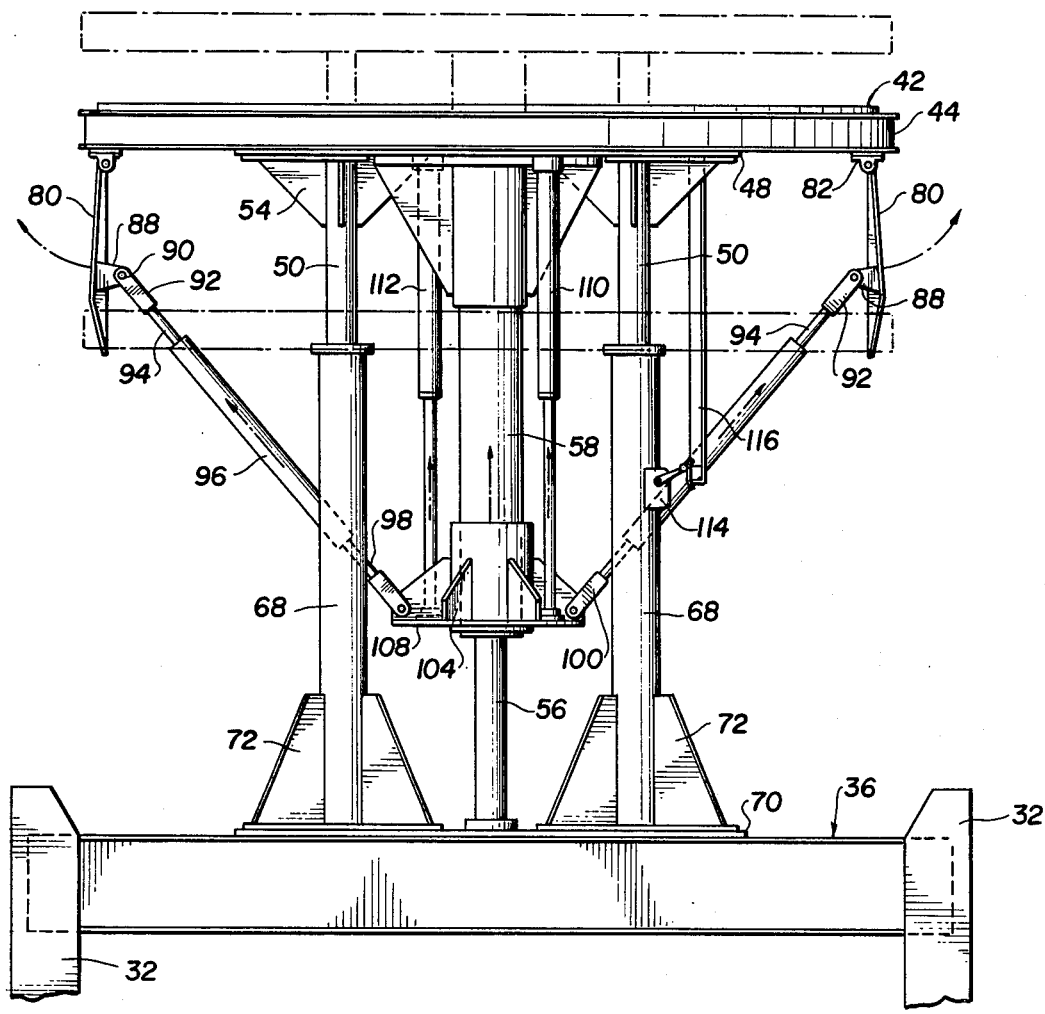
FIG. 2 is an enlarged elevation view of a portion of the converter lining apparatus of FIG. 1, with the safety shield shown in the collapsed position and with certain parts shown in broken lines in and alternate position.
Figure 3:
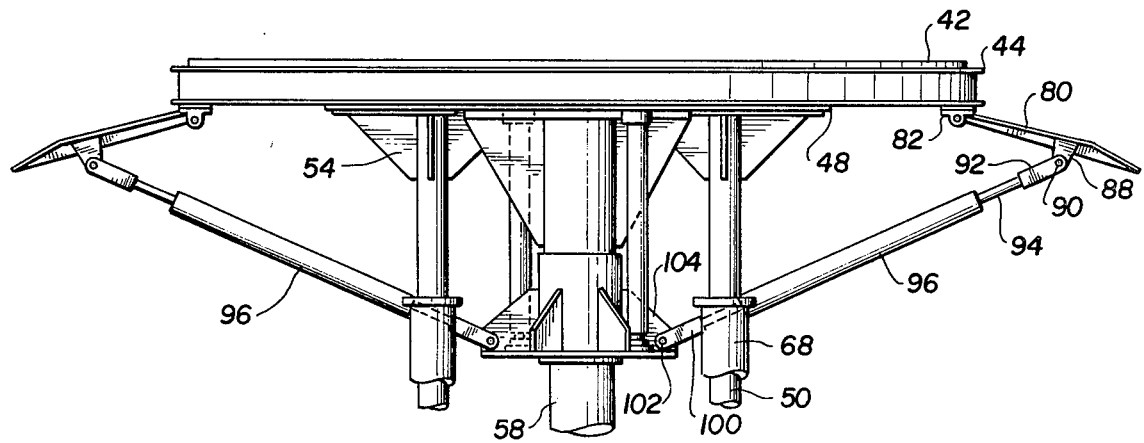
FIG. 3 is a fragmentary view similar to FIG. 2 showing the shield in the extended position.
Figure 5:
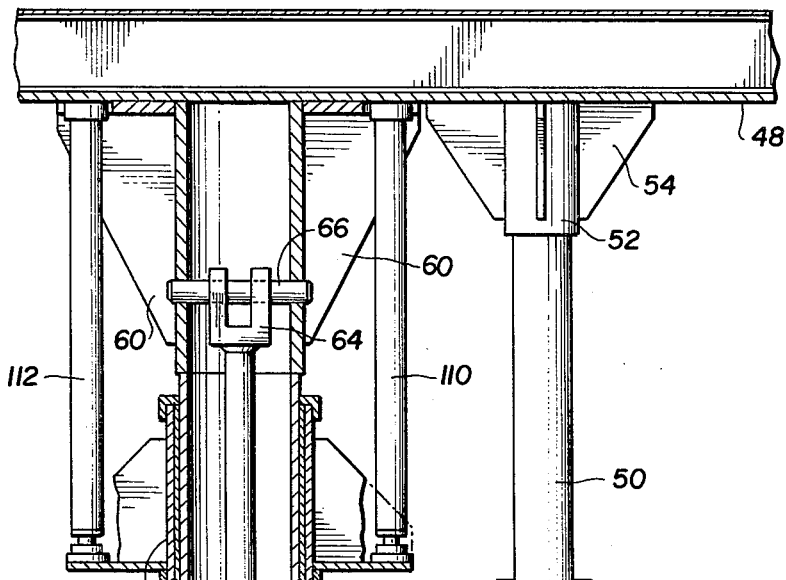
FIG. 5 is an enlarged fragmentary sectional view taken on line 5—5 of FIG. 4.

To move the extensible plate members 80 between the collapsed or lowered position in FIG. 2 and the raised or extended position shown in FIG. 3, at least selected ones of the plate members are provided on their under side with a lug member 88 which is connected, through pin 90 and clevis 92 to the end of threaded rod 94 of an elongated turnbuckle assembly 96. A second threaded rod 98 and clevis 100 on the other end of turnbuckle 96 is connected, through a pin 102, to a vertically extending gusset 104 rigidly welded to a cylindrical guide sleeve 106 slidably mounted on the downwardly projecting tubular member 58. A radially extending flange 108 is rigidly welded to gussets 104 and sleeve 106, and a pair of fluid cylinders 110, 112 each has its rod end connected to flange 108 and its cylinder end connected to bearing plate 48. Cylinders 110 and 112 are located on diametrically opposed sides of tubular member 58. Thus, actuation of the cylinders 110, 112 to retract their pistons from the fully extended position shown in FIG. 2 to the retracted position shown in FIGS. 3 and 5 will slide the sleeve 106 upwardly along the tubular member 58 so that turnbuckles 96 will pivot plate members 80 outward to their fully extended, or maximum diameter position for the safety umbrella shield. Conversely, extending the pistons of fluid cylinders 110, 112 will swing plate members 80 about their hinge connection to a generally vertical position as shown in FIG. 2 within a vertical cylinder defined by the diameter of structural member 44.

In the embodiment of the invention illustrated in the drawings, a total of 18 perforated plate members 80 are mounted at equally spaced intervals around the structural member 44, with each plate member 80 overlapping the edge portion of the next adjacent plate member 80 on one side and extending beneath the next adjacent plate member on its other side. In this embodiment, only six of the plate members 80 are connected, through turnbuckles 96, to the vertically sliding sleeve 106 to be positively moved between their radially extended and retracted positions by actuation of the cylinders 110 and 112. However, due to their overlapping relation, all plates 80 will be positively moved simultaneously to extend or retract the umbrella shield.

It is apparent that each plate member 80 could be connected through suitable rigid connecting rod members such as the turnbuckles 96, to the sleeve 106 if desired. Also, while turnbuckles 96 provide an easily adjustable means for connecting the plates 80 with the vertically sliding sleeve 106, and thereby the angular position of the respective plates in the fully extended and retracted positions any suitable connecting rod members might be used. Further, fluid actuated cylinders might be used in place of the turnbuckles, in which case the hydraulically actuated cylinders might be connected through a fixed connecting member directly to the tubular member 58.

Suitable control means, such as the microswitch 114 mounted on vertical column 68 in position to be actuated by an arm 116 carried by the vertically adjustable umbrella shield, may be provided to limit vertical movement of the shield by the fluid cylinder 56.

Referring again to FIG. 1, with the metallurgical vessel 10 in the upright position and the bottom plug removed, the repair apparatus 20 may be moved along tracks 24 into position beneath the vessel by the ladle car 26. The repair apparatus elevator mechanism, schematically illustrated as the fluid cylinder 38, can then be actuated to elevate the platform 36 to the desired level to enable workers on the platform to repair the refractory ring portion of the converter liner 14 around the opening 18, and to project the umbrella shield assembly 40 into the cylindrical opening 18. Fluid cylinder 56 can then be actuated to raise the shield assembly to the desired operating level within the converter, and pins 76 positioned to the appropriate openings 74 of columns 68 to provide positive support for the legs 50.

During positioning of the shield by cylinder 56, the pistons of fluid cylinders 110, 112 are extended so that sleeve 106 is in its lowermost position along tubular member 58. When the rigid central portion of the umbrella is fixed in position, fluid pressure is then applied to cylinders 110, 112 to retract their pistons and lift sleeve 106, thereby thrusting the turnbuckles 96 outward to move plates 80 to their fully extended position overlapping the bottom wall of the converter around the opening 18.

After the umbrella is extended, its vertical position may be adjusted if desired by actuation of piston 56 and movement of the pins 76 to position the outer circular peripheral edge 84 of the umbrella shield closely adjacent the bottom refractory wall of the metallurgical vessel as shown in FIG. 1. In this position, maximum protection is provided against falling debris such as pieces of slag or refractory material which otherwise might be deflected between the bottom wall and the umbrella shield. Positioning the shield closely adjacent the bottom also minimizes heat radiation from the interior of the vessel downwardly upon the workers on a platform 36. At the same time, the chimney effect of heat rising from the converter tends to draw cooling and ventilating air upward through the opening 18 and around plates 80 as well as through the perforations 86 in the plates, thereby enabling workers to repair the refractory ring portion of the bottom wall without requiring excessive cooling of the interior of the vessel.

Upon completion of the repair, the umbrella shield and working platform may be retracted from the interior of the vessel simply by reversal of the operations outlined above.

While a preferred embodiment of the invention has been disclosed and described in detail, it should be apparent that the invention is not so limited and it is therefore intended to include all embodiments which would be apparent to one skilled in the art and which come within the spirit and scope of the invention.

What is claimed is:

1. An expandable and retractable overhead safety shield for protecting workers on a vertically movable work platform during repair of the refractory lining of a metallurgical furnace such as a Q-BOF having an open top and a closable opening in its bottom wall, the safety shield comprising:

a rigid central portion extending above at least a portion of the work platform, a plurality of shield extension plate members pivotally mounted in overlapping relation around said rigid central portion for movement between a generally vertical retracted position and an extended position projecting outwardly from said rigid central portion, first power means for moving the shield extension plate members between the retracted and expanded positions, said safety shield being of a size and configuration to be moved vertically through the closable opening in the furnace bottom wall when the shield extension members are in the retracted position, said shield extension plate members in the extended position cooperating with said central portion to form a substantially continuous umbrella-like cover extending above said platform and having an area substantially greater than that of the opening in the bottom wall of the furnace, mounting means on the platform supporting said safety shield in vertically spaced relation to the platform, and said first power means being operably connected to selected ones only of the overlapping plate members, whereby movement of said selected ones of said plate members by said first power means results in simultaneous movement of all plate members.

2. The safety shield defined in claim 1 wherein said mounting means comprises second power means operable to vertically move said umbrella-like shield relative to said work platform.

3. The safety shield defined in claim 1 wherein the closable opening in the bottom wall of the furnace to be repaired is substantially circular and wherein said rigid central portion is substantially circular in horizontal section and has a diameter slightly less than the diameter of the closable opening.

4. The safety shield defined in claim 1 wherein at least selected ones of said plate members have a plurality of perforations formed therein to permit ventilating air to flow through the umbrella-like cover.

5. Repair apparatus for use in repairing the refractory lining of a metallurgical furnace having an open top and a closable opening in its bottom wall, said repair apparatus comprising, a work platform for supporting workers during repair of the furnace lining, elevator means supporting said platform for vertical movement from a position spaced below the closable opening to a position enabling workers supported on the platform to repair the furnace lining, an expandable and contractable safety shield supported on and extending above said platform in position to protect workers from falling debris, the safety shield including a rigid central portion and a movable outer portion and being capable of being contracted to a nonuse position having a size which will pass vertically through the closable opening in the bottom wall of the furnace upon upward movement of the elevator means to raise the platform, and expanded to a use position having an area substantially greater than said closable opening, said movable outer portion including a plurality of movable plate members each mounted for pivotal movement about a horizontal axis adjacent the outer periphery of said central portion, first power means operable to pivot said plate members about said horizontal axis to expand and contract the safety shield, mounting means supporting said safety shield on said work platform for vertical movement relative thereto, and second power means operable to move said safety shield vertically independently of said work platform.

6. Furnace repair apparatus for use in repairing the refractory lining on the bottom wall of a metallurgical furnace such as a Q-BOF having an open top and a closable opening in its bottom wall, said apparatus comprising, a work support platform for supporting workers during repair of the furnace lining, elevator means supporting said platform for vertical movement from a position spaced below the bottom furnace wall to a work position adjacent the closable opening to support workers in position to repair the refractory lining of the bottom wall adjacent the closable opening, a safety shield, mounting means supporting said safety shield above said platform in position to cover and protect workers on the platform from falling debris, the safety shield being capable of passing vertically through the closable opening in bottom wall and into the furnace upon movement of the platform to the work position and being capable of being expanded within the furnace to a size substantially greater than the closable opening to shield and protect workers on the platform while repairing the refractory lining on the bottom wall of the furnace, said safety shield including a rigid substantially circular central portion and a plurality of shield extension plate members pivotally mounted in substantially equally spaced overlapping relation around the periphery of said rigid central portion, said plate members being movable between a generally vertical retracted position and an extended position projecting outwardly from the central portion, said plate members in the extended position cooperating to provide a substantially uniform annular extension of said rigid circular central portion to provide a substantially circular umbrella-like shield having a diameter substantially greater than the diameter of the bottom opening in the furnace, and first power means for moving said extension member from the retracted position to the extended position to expand said shield, said first power means operably connected to selected ones only of the plate members whereby movement of said selected ones of said plate members by said first power means results in simultaneous movement of all plate members.

7. The furnace repair apparatus defined in claim 6 wherein said mounting means further comprises a plurality of adjustable support legs extending between said shield and said platform.

8. The furnace repair apparatus defined in claim 6 further comprising second power means for vertically moving said umbrella-like shield relative to the work platform.

9. The furnace repair apparatus defined in claim 6 wherein at least selected ones of said plate members have a plurality of perforations formed therein to permit ventilating air to flow through the umbrella-like cover.

* * * * *